US008338041B2

(12) United States Patent
Hatada

(10) Patent No.: US 8,338,041 B2
(45) Date of Patent: Dec. 25, 2012

(54) REFORMER AND INDIRECT INTERNAL REFORMING HIGH TEMPERATURE FUEL CELL

(75) Inventor: Susumu Hatada, Kanagawa (JP)

(73) Assignee: Nippon Oil Corporation (JP)

( * ) Notice: Subject to any disclaimer, the term of this patent is extended or adjusted under 35 U.S.C. 154(b) by 423 days.

(21) Appl. No.: 12/600,150

(22) PCT Filed: May 15, 2008

(86) PCT No.: PCT/JP2008/058943

§ 371 (c)(1),
(2), (4) Date: Nov. 13, 2009

(87) PCT Pub. No.: WO2008/140116

PCT Pub. Date: Nov. 20, 2008

(65) Prior Publication Data

US 2010/0227235 A1 Sep. 9, 2010

(30) Foreign Application Priority Data

May 16, 2007 (JP) ................................ 2007-130486

(51) Int. Cl.
*H01M 8/06* (2006.01)
*H01M 8/14* (2006.01)
*H01M 8/10* (2006.01)

(52) U.S. Cl. ........ 429/425; 429/423; 429/478; 429/479; 429/488; 429/495; 48/61; 423/650; 423/653; 422/198; 422/629

(58) Field of Classification Search ........................ None
See application file for complete search history.

(56) References Cited

U.S. PATENT DOCUMENTS 5,776,421 A * 7/1998 Matsumura et al. .......... 422/625
6,770,106 B1 * 8/2004 Okamoto et al. ............ 48/127.9
(Continued)

FOREIGN PATENT DOCUMENTS

CN 1321136 A 11/2001
(Continued)

OTHER PUBLICATIONS

International Search Report for International Application No. PCT/JP2008/058943 mailed Jul. 8, 2008 with English Translation.

(Continued)

*Primary Examiner* — Jeffrey Wollschlager
(74) *Attorney, Agent, or Firm* — Cantor Colburn LLP

(57) ABSTRACT

To provide a reformer that uses a relatively inexpensive granular catalyst and can provide a more uniform temperature distribution in a catalyst bed while suppressing increase in the size of the reformer and the required power and size of an auxiliary machine, and a more compact indirect internal reforming high temperature fuel cell while suppressing increase in cost. A reformer that produces a hydrogen-containing gas from a hydrocarbon-based fuel by a steam reforming reaction has a reactor vessel and a reforming catalyst bed packed with a granular catalyst having steam reforming activity in the reactor vessel, the reformer has a partition plate that divides the reforming catalyst bed into at least two sections, the partition plate has a thermal conductivity higher than effective thermal conductivity of the catalyst bed, and the partition plate extends in the reactor vessel from a part which is at a higher temperature in a rated operation to a part which is at a lower temperature in rated operation. An indirect internal reforming high temperature fuel cell has the reformer and a high temperature fuel cell that generates electric power using a hydrogen-containing gas, and the reformer is disposed at a position where the reformer receives thermal radiation from the high temperature fuel cell.

10 Claims, 2 Drawing Sheets

U.S. PATENT DOCUMENTS

| | | | | |
|---|---|---|---|---|
| 7,037,472 | B2 * | 5/2006 | Komiya et al. | 422/627 |
| 7,503,946 | B2 * | 3/2009 | Kuwabara et al. | 48/61 |
| 8,038,960 | B2 * | 10/2011 | Higashino | 422/198 |
| 2001/0024629 | A1 * | 9/2001 | Brauchle et al. | 422/198 |
| 2003/0137507 | A1 | 7/2003 | Rotge | |
| 2004/0105794 | A1 * | 6/2004 | Maenishi et al. | 422/190 |
| 2006/0143983 | A1 * | 7/2006 | Matsui et al. | 48/61 |

FOREIGN PATENT DOCUMENTS

| | | | |
|---|---|---|---|
| CN | 1914118 | A | 2/2007 |
| DE | 10149060 | A1 | 4/2003 |
| EP | 1304310 | A2 | 4/2003 |
| JP | 02-102101 | * | 4/1990 |
| JP | 04-265147 | * | 9/1992 |
| JP | 5-129026 | A | 5/1993 |
| JP | 7-272741 | A | 10/1995 |
| JP | 10-17303 | A | 1/1998 |
| JP | 11-11901 | A | 1/1999 |
| JP | 2001-172003 | A | 6/2001 |
| JP | 2001151502 | * | 6/2001 |
| JP | 2002-358997 | A | 12/2002 |
| JP | 2003-137507 | A | 5/2003 |
| JP | 2003226506 | * | 8/2003 |
| JP | 2004-269332 | A | 9/2004 |
| JP | 2004-319420 | A | 11/2004 |
| JP | 2006-19084 | A | 1/2006 |
| JP | 2006-327904 | A | 12/2006 |
| WO | 9510126 | A1 | 4/1995 |
| WO | 2005/073126 | A1 | 8/2005 |
| WO | 2007040146 | A1 | 4/2007 |

OTHER PUBLICATIONS

Chinese Office Action for Application No. 200880015922.2, issued Oct. 10, 2011, with English translation.

Office Action for Japanese Patent Application No. 2007-130486, dispatched Jun. 5, 2012, with partial English translation.

The extended European search report for European patent application No. 08752801 a mailing date of Oct. 10, 2012.

* cited by examiner

REFORMER AND INDIRECT INTERNAL REFORMING HIGH TEMPERATURE FUEL CELL

CROSS REFERENCE TO RELATED APPLICATIONS

This is a U.S. national stage of application No. PCT/JP2008/058943, filed on 15 May 2008. Priority under 35 U.S.C. §119(a) and 35 U.S.C. §365(b) is claimed from Japanese Application No.2007-130486, filed 16 May 2007, the disclosure of which is also incorporated herein by reference.

TECHNICAL FIELD

The present invention relates to a reformer that reforms a hydrocarbon-based fuel, such as kerosene, to produce a hydrogen-containing gas and an indirect internal reforming high temperature fuel cell that generates electric power using the hydrogen-containing gas produced by the reformer.

BACKGROUND ART

Typically, a solid oxide fuel cell (sometimes abbreviated as SOFC hereinafter) is supplied with a hydrogen-containing gas (reformed gas) produced by reforming a hydrocarbon-based fuel, such as kerosene and city gas, at a reformer. The SOFC generates electric power by electrochemical reaction of the reformed gas and air. The SOFC typically operates at a high temperature approximately ranging from 550° C. to 1000° C.

There are various types of reforming reaction, such as steam reforming and partial oxidation reforming. In particular, the steam reforming is most commonly used because the reformed gas produced by the steam reforming contains a high concentration of hydrogen. The steam reforming is an extremely highly endothermic reaction and requires a relatively high reaction temperature of about 550° C. to 750° C. and therefore a high temperature heat source. Therefore, an indirect internal reforming SOFC has been developed that is provided with a reformer disposed in the vicinity of the SOFC (at a location where the reformer receives thermal radiation from the SOFC) so that the reformer is heated by the radiation heat from the SOFC. In particular, an indirect internal reforming SOFC burns the anode off gas containing a combustible component (gas discharged from the anode of the SOFC) in a container (module container) of the indirect internal reforming SOFC and uses the combustion heat as a heat source to heat the reformer (Patent Document 1).

Reforming catalysts having various kinds of structure, such as a granular catalyst (Patent Document 2) and honeycomb-type catalysts (Patent Documents 3 and 4), are known. Among others, the granular catalyst is relatively inexpensive and widely used.

Patent Document 1: Japanese Patent Laid-Open No. 2004-319420

Patent Document 2: Japanese Patent Laid-Open No. H5-129026

Patent Document 3: Japanese Patent Laid-Open No. 2004-269332

Patent Document 4: Japanese Patent Laid-Open No. 2006-327904

DISCLOSURE OF THE INVENTION

Problems to be Solved by the Invention

However, in general, a granular catalyst bed has a low effective thermal conductivity. If the granular bed has a large height in the direction of the thermal radiation from the SOFC, a large temperature difference can occur in the direction, resulting in an insufficient reforming reaction in a part at a lower temperature. In this case, a larger amount of catalyst is required, and thus, the reformer has to have a larger size. The local temperature decrease may be prevented by turning back the flow of the reforming gas as described in Patent Document 2. However, if the flow of the gas is turned back in order to uniform the heat distribution in the reformer, the cross sectional area of the flow channel decreases, or the length of the flow channel increases. This causes increase in the pressure loss and in the required power and the size of an auxiliary machine, such as a blower for supplying gas to the reformer.

An object of the present invention is to provide a reformer that uses a relatively inexpensive granular catalyst and can provide a more uniform temperature distribution in a catalyst bed while suppressing increase in the size of the reformer, the pressure loss, and the required power and size of an auxiliary machine.

An another object of the present invention is to provide a more compact indirect internal reforming high temperature fuel cell that has such a reformer while suppressing increase in cost.

Means for Solving the Problems

The present invention provides a reformer for producing a hydrogen-containing gas from a hydrocarbon-based fuel by a steam reforming reaction, comprising:

a reactor vessel; and a reforming catalyst bed packed with a granular catalyst having steam reforming activity in the reactor vessel, wherein the reformer has a partition plate for dividing the reforming catalyst bed into at least two sections, the partition plate has a thermal conductivity higher than the effective thermal conductivity of the catalyst bed, and the partition plate extends in the reactor vessel from a part which is at a higher temperature in rated operation to a part which is at a lower temperature in rated operation.

The reformer may have a heat source for heating said reactor vessel from outside the reactor vessel.

Furthermore, the reformer may have a heat source for heating the catalyst bed inside said reactor vessel.

The present invention provides an indirect internal reforming high temperature fuel cell, comprising:

a reformer for producing a hydrogen-containing gas from a hydrocarbon-based fuel by a steam reforming reaction; and a high temperature fuel cell for generating electric power using the hydrogen-containing gas, the reformer having a reactor vessel and a reforming catalyst bed packed with a granular catalyst having steam reforming activity in the reactor vessel, and the reformer being disposed at a position where the reformer receives thermal radiation from the high temperature fuel cell, wherein the reformer has a partition plate for dividing the reforming catalyst bed into at least two sections, the partition plate has a thermal conductivity higher than the effective thermal conductivity of the catalyst bed, and the partition plate extends in the reactor vessel from a part which is at a higher temperature in rated operation to a part which is at a lower temperature in rated operation.

Advantages of the Invention

The present invention provides a reformer that uses a relatively inexpensive granular catalyst and can provide a more uniform temperature distribution in a catalyst bed while suppressing increase in the size of the reformer, the pressure loss, and the required power and size of an auxiliary machine.

The present invention provides a more compact indirect internal reforming high temperature fuel cell that has such a reformer while suppressing increase in cost.

DESCRIPTION OF SYMBOLS

Figure 1:
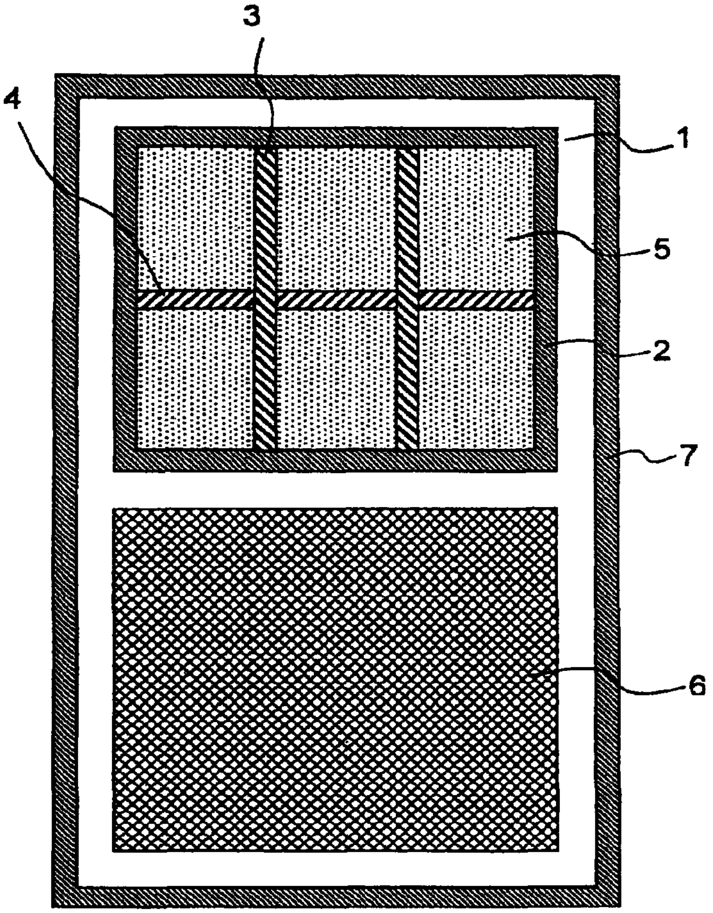
FIG. 1 is a schematic cross-sectional side view for illustrating an example of an indirect internal reforming high temperature fuel cell according to the present invention.

1: reformer
2: reforming vessel
3: first partition plate
4: second partition plate
5: reforming catalyst bed
6: SOFC
7: module container
8: electric heater

BEST MODE FOR CARRYING OUT THE INVENTION

In the following, embodiments of the present invention will be described with reference to the drawings. However, the present invention is not limited by the embodiments described below.

FIG. 1 is a schematic cross-sectional side view of an indirect internal reforming SOFC, which is an example of an indirect internal reforming high temperature fuel cell according to the present invention. This drawing shows a cross section perpendicular to the direction of flow of a gas in a reformer (the direction of flow of a reformed gas). In the drawing, the reformed gas flows in the direction perpendicular to the sheet of the drawing. The indirect internal reforming SOFC has a reformer 1 that produces a hydrogen-containing gas (reformed gas) from a hydrocarbon-based fuel using a steam reforming reaction and an SOFC 6 that generates electric power using the hydrogen-containing gas. That is, the hydrogen-containing gas (reformed gas) produced by the reformer 1 is supplied to an anode of the SOFC 6, an oxygen-containing gas, such as air, is supplied to a cathode of the SOFC 6, and the SOFC generates electric power by an electrochemical reaction between hydrogen and oxygen.

The indirect internal reforming SOFC further has a housing 7 (sometimes referred to as a module container hereinafter) that houses the reformer and the SOFC. That is, the reformer and the SOFC are modularized.

The reformer 1 has a reactor vessel (referred to also as a reforming vessel hereinafter) 2 and a reforming catalyst bed 5 packed with a granular catalyst housed in the reactor vessel 2. The reforming catalyst has steam reforming activity.

The reformer 1 is disposed at a position where the reformer 1 receives thermal radiation from the SOFC 6.

Here, the reformer has the shape of a rectangular parallelepiped. The SOFC also has the shape of a rectangular parallelepiped.

The reformer is disposed above the SOFC. At least in rated operation, the reforming vessel is heated at the lower surface by radiation heat from the SOFC. If an anode off gas (gas discharged from the anode) is burned on the upper surface of the SOFC, the reforming vessel is heated at the lower surface also by the combustion heat.

The reformer has a partition plate 3 that divides the reforming catalyst bed into at least two sections. The partition plate 3 extends in the reforming vessel from a part which is at a higher temperature in rated operation to a part which is at a lower temperature in rated operation. In the following, the partition plate will be sometimes referred to as a first partition plate.

Here, two planar partition plates 3 extend in the vertical direction. That is, the partition plates 3 extend from the surface (the lower surface) of the reforming vessel 2 facing the SOFC to the upper surface of the reforming vessel 2, the upper surface being located farther from the SOFC than the lower surface.

Thus, heat is transferred from the lower surface of the reactor vessel toward the upper surface through the partition plates 3, and the reforming catalyst in the upper part is also adequately heated.

In FIG. 1, one planar partition plate 4 extending in the horizontal direction is provided in addition to the first partition plates. The partition plate 4 is preferably used to provide a uniform heat distribution in lateral direction. In the following, this partition plate will be sometimes referred to as a second partition plate.

The partition plates 3 and the partition plate 4 divide the reforming catalyst bed into six sections in total in the plane perpendicular to the direction of flow of the reforming gas.

[Partition Plate]

The first partition plate has a thermal conductivity higher than the effective thermal conductivity of the reforming catalyst bed. In case that the second partition plate is also provided, a thermal conductivity thereof is higher than the effective thermal conductivity of the reforming catalyst bed.

The effective thermal conductivity of the catalyst bed is an apparent thermal conductivity on the assumption that the catalyst bed is homogeneous and can be measured or calculated by an appropriate method.

The partition plates may be made of any appropriate material that is resistant to use environment and has a thermal conductivity higher than the effective thermal conductivity of the catalyst bed, such as stainless steel. In view of preventing deformation or destruction due to a difference in linear expansion coefficients, or when there is a possibility of embrittlement in a contact or joint part due to a chemical reaction, the partition plates are preferably made of the same material as the reactor vessel. For example, when the reactor vessel of the reformer is formed of metal plates, and the metal plates have a thermal conductivity higher than the effective thermal conductivity of the catalyst bed, the first and second partition plates are preferably made of the same metal as the reforming vessel.

The shape of the partition plates is not limited to the planar shape but may be any appropriate shape, such as a shape of a bent plate.

In FIG. 1, two first partition plates 3 are disposed at regular intervals to trisect the reforming catalyst bed in the horizontal direction. However, the present invention is not limited to this configuration. It is essential only that the first partition plate(s) extends in the reforming vessel from a part heated to a higher temperature in rated operation toward a part heated to a lower temperature in rated operation. As a result, the partition plate(s) extends from a part closer to the heat source to a part farther from the heat source.

Figure 2:
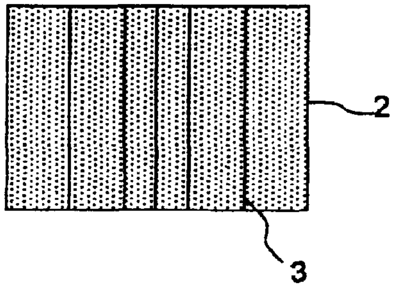
FIG. 2 is a schematic cross-sectional side view for illustrating an example of a reformer according to the present invention.
Figure 3:
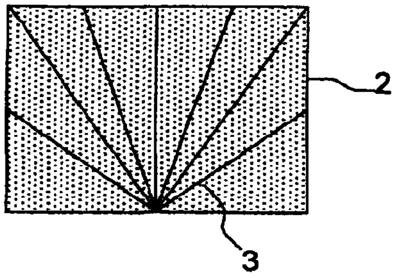
FIG. 3 is a schematic cross-sectional side view for illustrating another example of the reformer according to the present invention.
Figure 4:
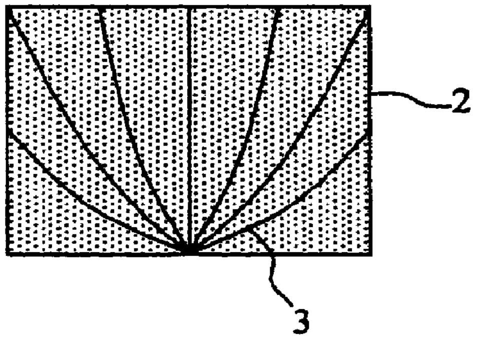
FIG. 4 is a schematic cross-sectional side view for illustrating a further example of the reformer according to the present invention.

Each of FIGS. 2, 3 and 4 shows an example of a reformer that can replace the reformer shown in FIG. 1. These drawings are also schematic cross-sectional views taken perpendicularly to the direction of flow of the gas in the reformer. In FIG. 2, first partition plates 3 are disposed at higher densities in areas closer to the center (in the horizontal direction) of the reformer and at lower densities in areas farther from the center. In FIG. 3, first partition plates 3 are disposed to radially extend from the center of the lower surface of the reformer vessel. In FIG. 4, first partition plates 3 in the shape of a curved surface are disposed to radially extend from the center of the lower surface of the reformer vessel. Depending on the positional relationship with the heat source or the like, an appropriate one of the configurations shown in FIGS. 2, 3 and 4 may be selected.

Of course, the first partition plate is disposed not to inhibit the flow of the gas in the reformer. For example, the first partition plate may be disposed to extend along the direction of flow of the gas in the reformer (direction of flow of the reformed gas). The same holds true for the second partition plate.

In the configuration shown in FIG. 1, the SOFC 6 heats the reactor vessel 2 from outside of the reactor vessel 2. However, the present invention is not limited to this configuration. Even if the reformer is provided with any other heat source than the fuel cell and the reactor vessel is heated from outside by the heat source, the first partition plates provide the same effect. For example, the reformer may have combusting means, such as a burner and a catalyst combustor, and the reforming vessel may be heated from outside by the combusting means. Or, the reformer may have heating means, such as an electric heater, provided outside the reactor vessel, and the reforming vessel may be heated from outside by the heating means.

Figure 5:
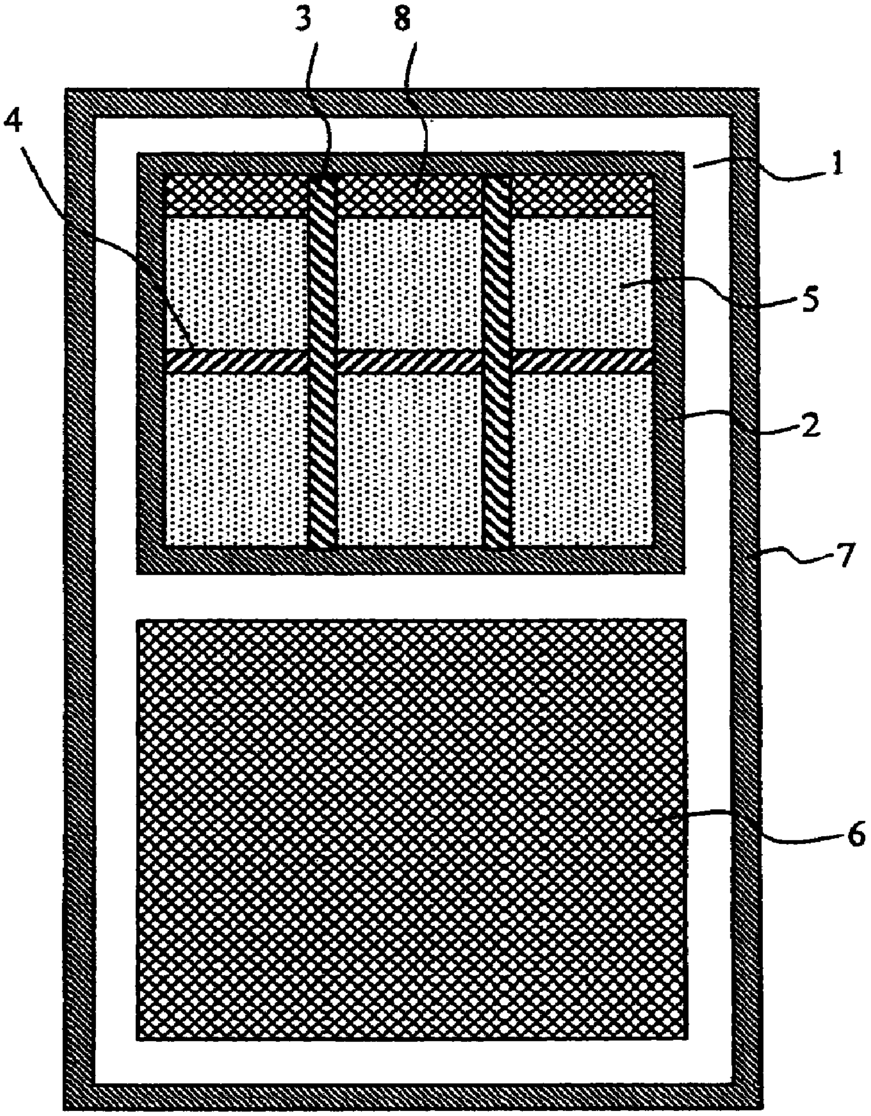
FIG. 5 is a schematic cross-sectional side view for illustrating another example of the indirect internal reforming high temperature fuel cell according to the present invention.

Further, the reformer may be equipped with a heat source that heats the catalyst bed inside the reactor vessel. FIG. 5 shows an indirect internal reforming high temperature fuel cell in which a reformer 1 has a heating means, such as an electric heater 8, inside a reactor vessel 2, and a catalyst bed is heated inside the reactor vessel 2 by the heating means. Also in this case, the first partition plates provide the same effect.

The reformer according to the present invention has a partition plate made of a material, such as metal, having a thermal conductivity higher than the effective thermal conductivity of the catalyst bed. The partition plate extends in the reactor vessel from a part which is at a higher temperature in rated operation to a part which is at a lower temperature in rated operation. Therefore, the thermal radiation from the high temperature fuel cell can be efficiently conducted to the entire catalyst bed, the catalyst bed can be more uniformly heated to a higher temperature, and the size of the reformer can be reduced.

[Hydrocarbon-Based Fuel]

It is possible to use, as appropriate, a hydrocarbon-based fuel selected from among compounds of which molecules contain carbon and hydrogen (may also contain other elements such as oxygen) or mixtures thereof that are well known as a feedstock for reformed gas in the field of the high temperature fuel cell. It is possible to use compounds of which molecules contain carbon and hydrogen, such as hydrocarbons and alcohols. For example, hydrocarbon fuels such as methane, ethane, propane, butane, natural gas, liquefied petroleum gas (LPG), city gas, gasoline, naphtha, kerosene and gas oil, alcohols such as methanol and ethanol, and ethers such as dimethyl ether may be used.

Among others, kerosene and LPG are preferred because they are readily available. In addition, kerosene and LPG can be stored in a stand-alone manner and therefore are useful in areas where the city gas pipeline is not built. In addition, high temperature fuel cells using kerosene or LPG are useful as an emergency power supply. Kerosene is particularly preferred because it is easy to handle.

[High Temperature Fuel Cell]

The present invention may be suitably applied to an indirect internal reforming fuel cell in which a reformer can be heated by thermal radiation from a high temperature fuel cell. In addition to the SOFC, a molten carbonate fuel cell (MCFC) is an example of the high temperature fuel cell of this type.

The SOFC may be selected, as appropriate, from well-known SOFCs having various shapes, such as planar SOFCs and tubular SOFCs. The SOFC may have an appropriate shape, such as a rectangular parallelepiped stack of planar SOFCs (including a cubic stack of planar SOFCs), a cylindrical SOFC stack, a bundle of tubular SOFC cells, and a cylindrical tubular SOFC cells. Typical electrolytes used in the SOFC include oxygen-ion conductive ceramic and proton-ion conductive ceramic.

The MCFC may also be appropriately selected from among well-known MCFCs.

The SOFC and MCFC may be a single cell. However, in practice, a stack or bundle in which a plurality of single cells is arrayed is preferably used. In that case, the number of stacks or bundles can be one or more.

[Reformer]

The reformer has a reforming catalyst bed packed with a granular catalyst having steam reforming activity in a reactor vessel. The reforming catalyst having steam reforming activity may be selected, as appropriate, from among steam reforming catalysts which have steam reforming activity and autothermal reforming catalysts which have both of partial oxidation reforming activity and steam reforming activity.

The hydrocarbon-based fuel (vaporized beforehand as required) and steam and if necessary an oxygen-containing gas, such as air, may be supplied each independently or mixed beforehand to the reformer (reforming catalyst bed). The reforming gas is supplied to the anode of the high temperature fuel cell.

Among other indirect internal reforming high temperature fuel cells, the indirect internal reforming SOFC is superior in thermal efficiency. The indirect internal reforming SOFC has a reformer that produces a reforming gas containing hydrogen from a hydrocarbon-based fuel by a steam reforming reaction and a SOFC. The reformer may perform a steam reforming reaction or perform autothermal reforming in which the steam reforming reaction is accompanied with the partial oxidation reaction. From the viewpoint of power generation efficiency of the SOFC, it is preferred that no partial oxidation reaction occurs. Thus, the autothermal reforming is designed so that the steam reforming is predominant, and therefore, the overall reforming reaction is endothermic. The heat required for the reforming reaction is supplied from the SOFC. The reformer and the SOFC are housed in one module container and modularized. The reformer is disposed at a position where the reformer receives the thermal radiation from the SOFC. This arrangement allows the reformer to be heated by the thermal radiation from the SOFC during electric power generation. In addition, the anode off gas discharged from the SOFC may be burned at the outlet of the cell to heat the SOFC.

In the indirect internal reforming SOFC, the reformer is preferably disposed at a position where direct radiation heat transfer from the SOFC to the outer surface of the reformer is possible. Therefore, it is preferred that there is substantially no obstacle between the reformer and the SOFC, or in other words, it is preferred to make the region between the reformer and the SOFC be an empty space. In addition, the distance between the reformer and the SOFC is preferably as short as possible.

Each supply gas is appropriately heated as required before being supplied to the reformer or the SOFC.

The module container may be any appropriate container capable of housing the SOFC and the reformer. The module container may be made of any appropriate material having resistance to the environment in which the module container is used, such as stainless steel. Connection ports are provided for the module container for gas interfacing or the like as required.

In particular, if the cell outlet opens in the module container, the module container is preferably hermetic in order to prevent communication between the interior of the module container and the surroundings (atmosphere).

[Reforming Catalyst]

Both the steam reforming catalyst and the autothermal reforming catalyst used in the reformer may be a well-known catalyst. Examples of the steam reforming catalyst include a ruthenium-based catalyst or a nickel-based catalyst, and examples of the autothermal reforming catalyst include a rhodium-based catalyst.

According to the present invention, a granular catalyst is used. For example, the granular catalyst may be a catalyst formed by performing tablet compression, pulverization and then particle size selection within an appropriate range, a catalyst formed by extrusion molding, a catalyst formed by mixing with an appropriate binder and extrusion molding, or a powdered catalyst. Alternatively, the catalyst may be a metal supported by a carrier formed by performing tablet compression, pulverization and then particle size selection within an appropriate range, a carrier formed by extrusion molding, a powdered carrier, or a carrier molded into an appropriate shape, such as a sphere, a ring, a tablet, a cylinder and a flake.

In the following, conditions in rated operation of the reformer for each of the steam reforming, the autothermal reforming and the partial oxidation reforming will be described.

In the steam reforming, steam is added to the hydrocarbon-based fuel, such as kerosene. For example, the reaction temperature of the steam reforming may range from 400° C. to 1000° C., preferably from 500° C. to 850° C., or more preferably from 550° C. to 800° C. The amount of steam introduced into the reaction system is defined as a ratio (steam/carbon ratio) of the number of moles of water molecules to the number of moles of carbon atoms contained in the hydrocarbon-based fuel, and the value of the ratio preferably falls within a range of 1 to 10, more preferably within a range of 1.5 to 7, or further preferably within a range of 2 to 5. In the case where the hydrocarbon-based fuel is liquid, the space velocity (LHSV) is expressed as NB, where A represents the flow rate (Uh) of the hydrocarbon-based fuel in the liquid state, and B represents the volume (L) of the catalyst bed. The value of the LHSV is preferably set within a range of 0.05 to 20 $h^{-1}$, more preferably within a range of 0.1 to 10 $h^{-1}$, or further preferably within a range of 0.2 to 5 $h^{-1}$.

In the autothermal reforming, not only steam but also an oxygen-containing gas is added to the hydrocarbon-based fuel. The oxygen-containing gas is preferably air because air is readily available, although the oxygen-containing gas may be pure oxygen. The oxygen-containing gas may be added in order to balance the endothermic reaction involved with the steam reforming reaction and to obtain an amount of heat generation enough to keep or raise the temperature of the reforming catalyst bed and the SOFC. The amount of oxygen-containing gas added is, as a ratio (oxygen/carbon ratio) of the number of moles of oxygen molecules to the number of moles of carbon atoms contained in the hydrocarbon-based fuel, preferably within a range of 0.005 to 1, more preferably within a range of 0.01 to 0.75, or further preferably within a range of 0.02 to 0.6. For example, the reaction temperature of the autothermal reforming reaction is set within a range of 400° C. to 1000° C., preferably within a range of 450° C. to 850° C., or more preferably within a range of 500° C. to 800° C. In the case where the hydrocarbon-based fuel is liquid, the space velocity (LHSV) is preferably selected within a range of 0.05 to 20, more preferably within a range of 0.1 to 10, or further preferably within a range of 0.2 to 5. The amount of steam introduced into the reaction system is, as the steam/carbon ratio, preferably within a range of 1 to 10, more preferably within a range of 1.5 to 7, or further preferably within a range of 2 to 5.

[Other Devices]

As required, the indirect internal reforming high temperature fuel cell according to the present invention may be additionally provided with a well-known component of a high temperature fuel cell system, as appropriate. For example, such a component may be a desulfurizer that reduces the sulfur content of the hydrocarbon-based fuel; a vaporizer that vaporizes a liquid; pressure increasing means that pressurizes various kinds of fluids, such as a pump, a compressor and a blower; flow rate controlling means or flow path blocking/switching means that regulates the flow rate of a fluid or blocks a fluid flow or switches among fluid flow paths, such as a valve; a heat exchanger that performs heat exchange or heat recovery; a condenser that condenses a gas; heating/warming means that externally heats various kinds of equipment using steam or the like; storage means that stores the hydrocarbon-based fuel or a combustible material; an air or electric system for instrumentation; a signal system for control; a control device; and an electric system for output or powering.

Industrial Applicability

The reformer and the indirect internal reforming high temperature fuel cell according to the present invention can be applied to, for example, a stationary or mobile power generating system or in a cogeneration system.

What is claimed is:

1. An indirect internal reforming high temperature fuel cell, comprising:

a reformer for producing a hydrogen-containing gas from a hydrocarbon-based fuel by a steam reforming reaction; and a high temperature fuel cell that generates electric power using the hydrogen-containing gas, the reformer comprising a reactor vessel and a reforming catalyst bed packed with a granular catalyst having steam reforming activity in the reactor vessel, and the reformer being disposed at a position wherein the reformer receives thermal radiation from the high temperature fuel cell, wherein the reformer has a partition plate for dividing the reforming catalyst bed into at least two sections, a thermal conductivity of the partition plate is higher than an effective thermal conductivity of the catalyst bed, the partition plate extends in the reactor vessel from a part which is at a higher temperature in rated operation to a part which is at a lower temperature in rated operation, the high temperature fuel cell is essentially in a shape of a rectangular parallelepiped, and is configured so that an anode off gas is able to be burned on the upper surface of the high temperature fuel cell, and the reformer is disposed above the high temperature fuel cell, and is configured so that a flow direction of a gas in the reformer is essentially horizontal.

2. The indirect internal reforming high temperature fuel cell of claim 1, wherein the reactor vessel is heated at a lower surface by combustion heat of the anode off gas burned on the top surface of the high temperature fuel cell.

3. The indirect internal reforming high temperature fuel cell of claim 1, wherein the reformer further comprises a second partition plate.

4. The indirect internal reforming high temperature fuel cell of claim 1, wherein the partition plate comprises a metal.

5. The indirect internal reforming high temperature fuel cell of claim 1, wherein the partition plate is disposed to extend along the direction of flow of the gas in the reformer.

6. The indirect internal reforming high temperature fuel cell of claim 1, wherein the reformer further comprise a heat source that heats the catalyst bed inside the reactor vessel.

7. The indirect internal reforming high temperature fuel cell of claim 6, wherein the heat source is an electric heater.

8. The indirect internal reforming high temperature fuel cell of claim 1, wherein the high temperature fuel cell comprises a solid oxide fuel cell.

9. The indirect internal reforming high temperature fuel cell of claim 1, wherein the high temperature fuel cell comprises a molten carbonate fuel cell.

10. The indirect internal reforming high temperature fuel cell of claim 1, wherein the granular catalyst comprises steam reforming catalyst including a ruthenium-based catalyst or a nickel-based catalyst.

* * * * *